Jan. 30, 1968   E. M. LIEBERMAN   3,365,974
ANTI-FRICTION WORM GEARING DRIVE
Filed Oct. 7, 1965   6 Sheets-Sheet 1

INVENTOR.
EDGAR M. LIEBERMAN
BY
Fishburn & Gold
ATTORNEYS

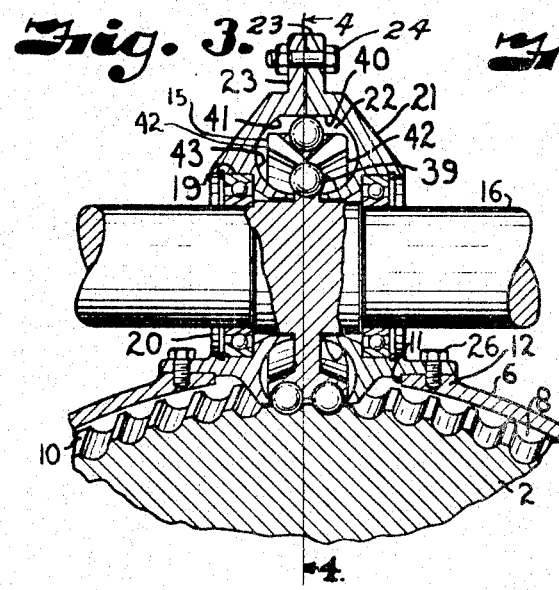
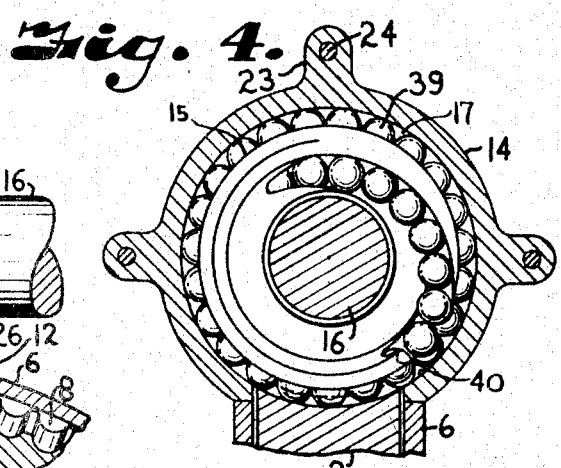
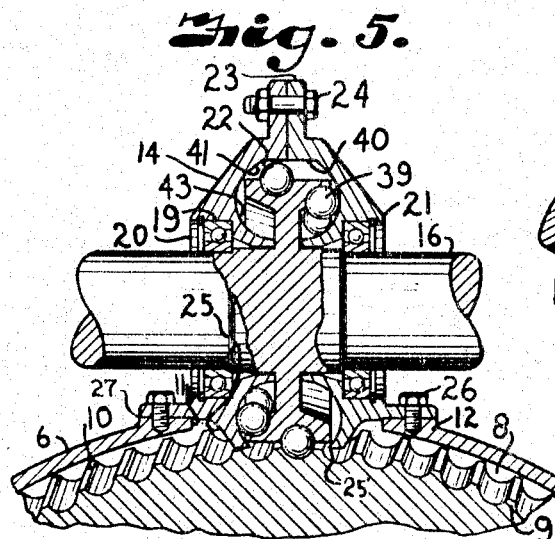
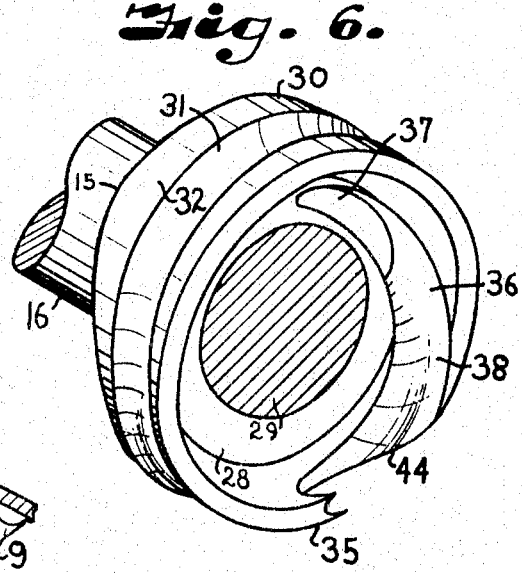
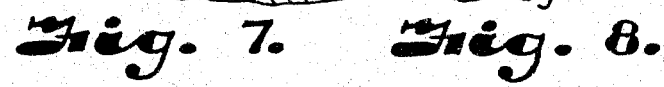
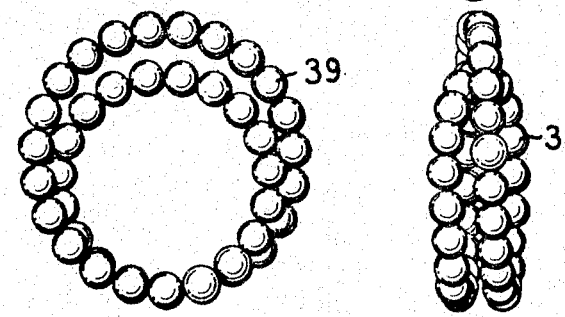

Jan. 30, 1968  E. M. LIEBERMAN  3,365,974
ANTI-FRICTION WORM GEARING DRIVE
Filed Oct. 7, 1965  6 Sheets-Sheet 3
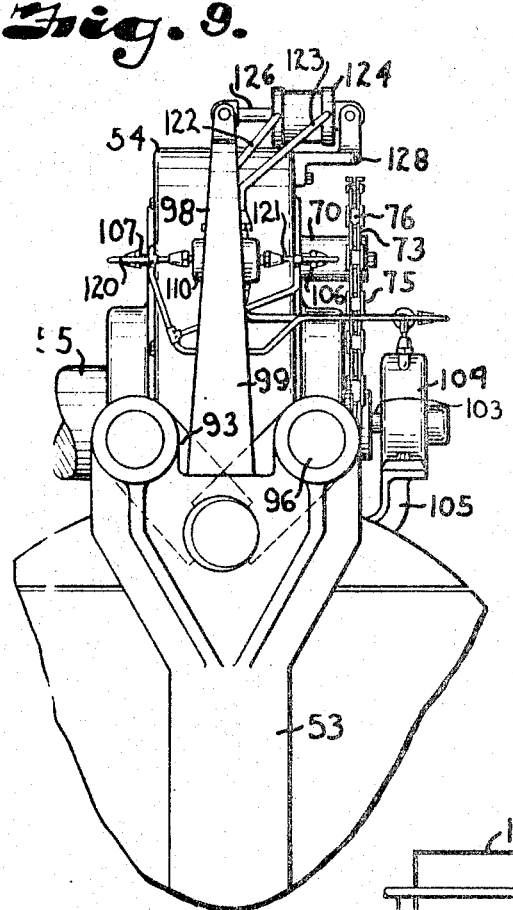
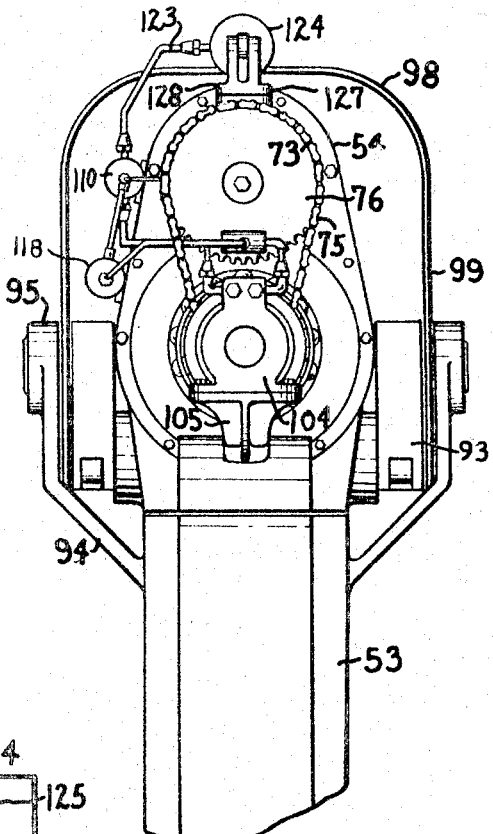
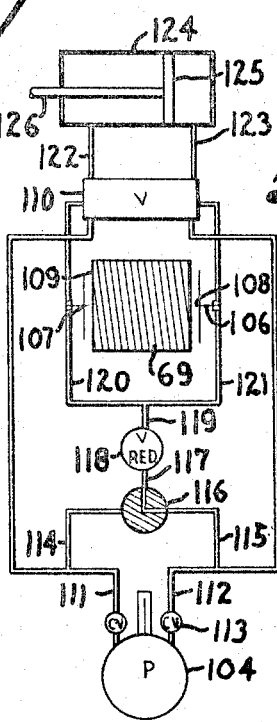
INVENTOR.
EDGAR M. LIEBERMAN
BY
ATTORNEYS

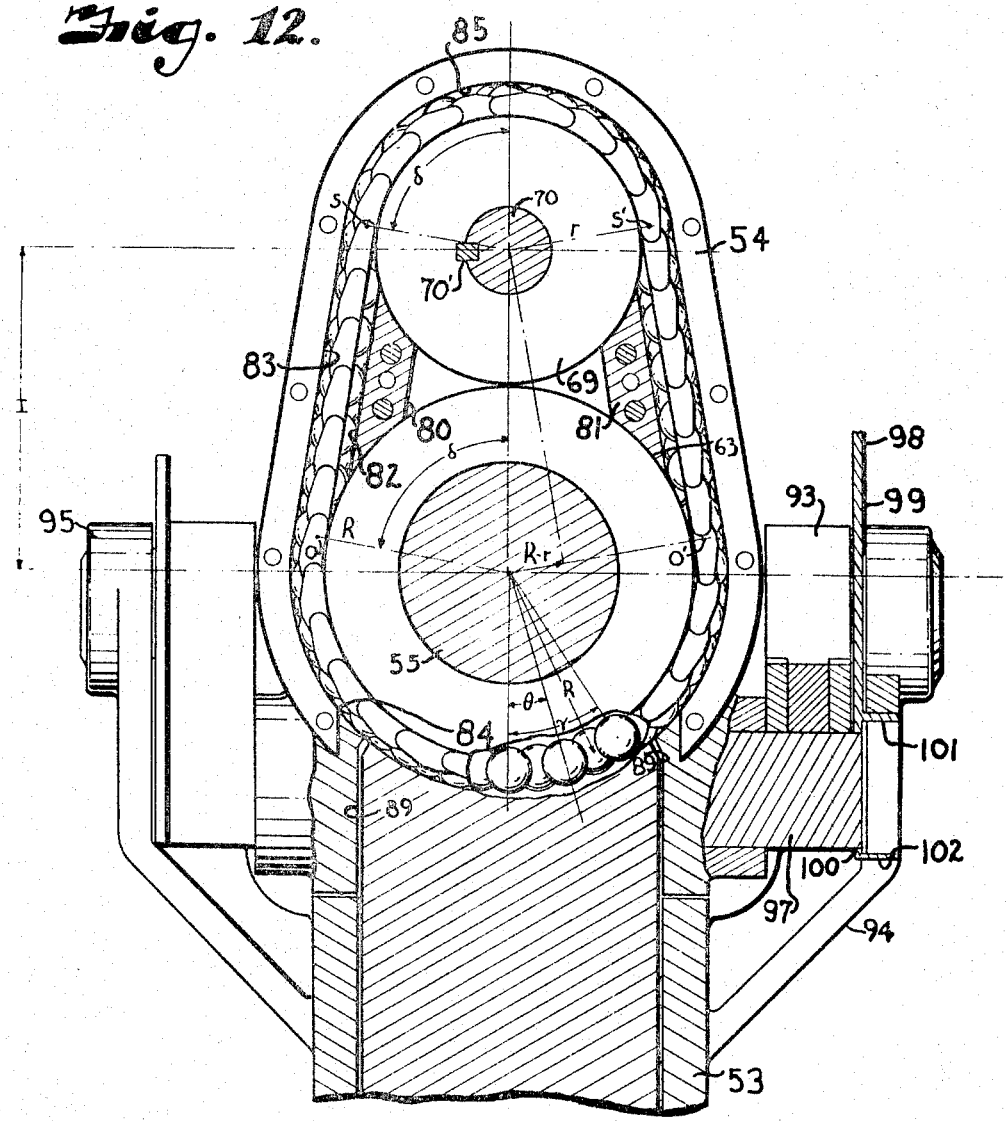

Jan. 30, 1968  E. M. LIEBERMAN  3,365,974
ANTI-FRICTION WORM GEARING DRIVE
Filed Oct. 7, 1965  6 Sheets-Sheet 5

INVENTOR.
EDGAR M. LIEBERMAN
BY
*Fishburn & Gold*
ATTORNEYS

Jan. 30, 1968          E. M. LIEBERMAN          3,365,974
                 ANTI-FRICTION WORM GEARING DRIVE
Filed Oct. 7, 1965                              6 Sheets-Sheet 6
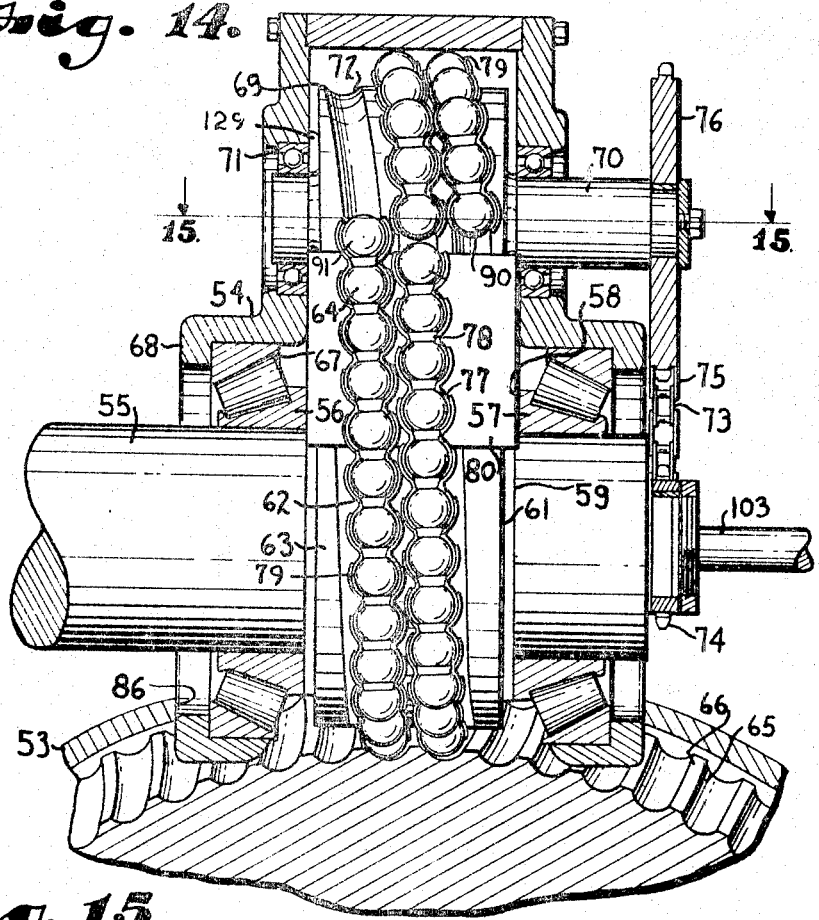
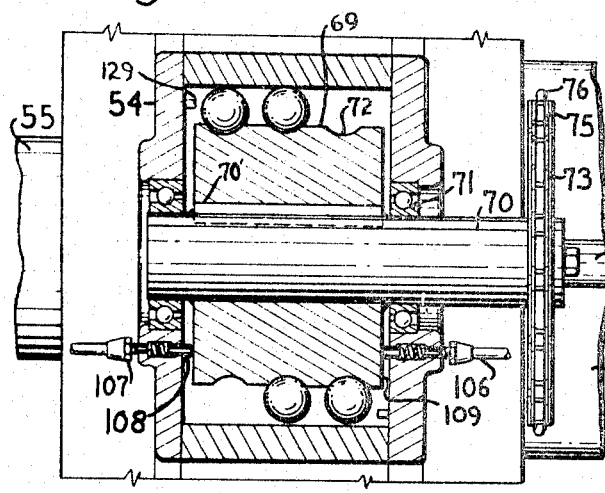
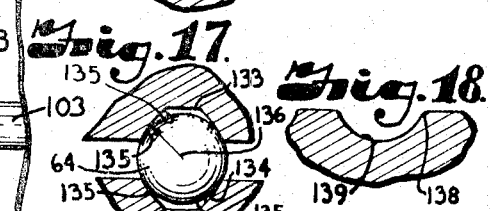
INVENTOR.
EDGAR M. LIEBERMAN
BY
ATTORNEYS

United States Patent Office 3,365,974
Patented Jan. 30, 1968

3,365,974
ANTI-FRICTION WORM GEARING DRIVE
Edgar M. Lieberman, 7309 Sycamore,
Kansas City, Mo. 64133
Filed Oct. 7, 1965, Ser. No. 493,832
17 Claims. (Cl. 74—425)

ABSTRACT OF THE DISCLOSURE

An anti-friction worm gearing drive for power transmissions wherein the worm and worm gear have grooves in the peripheries thereof of the same helical angle, wherein an anti-friction element such as balls interposed between the worm and worm gear effecting the driving engagement therebetween, and transfer means cooperating with the worm and worm gear for moving the balls in a series tangentialy from the worm groove at one side and reintroducing the balls in a worm groove substantially tangentially for another pass between the worm and worm gear for driving same said movement of the balls tangentially to and from the worm grooves effecting said transfer being with a gradual change of direction of said balls, and a worm and worm gear drive with balls-interposed therebetween, with mechanism operative in response to relative movement of the worm and worm gear for adjusting the pressure angle or position of the balls in response to the loading on the balls between the worm and worm gear.

---

Worm gear drives have been used where a high input speed is desired with a low output speed, but with such worm and worm gear drives there is a substantial friction loss, and resulting low efficiency. In the transmission of large amounts of power, worm and worm gear speed reducers are not usually used because of such high friction losses inherent in such drives. These losses become increasingly unacceptable particularly in single thread worm and gear reductions as the speed ratios between input and output shafts increase. This situation exists even though in recent years there have been improved manufacturing methods and better lubricants. There have been attempts to overcome the friction loss inherent in such worm and worm gear drives, but they have been unsuccessful in providing for high speed operation or economy of manufacture. Due to this difficulty, present mechanisms for transmitting large horse powers at high ratios at reasonable efficiency use multiple reductions and are large, expensive and noisy.

The present invention contemplates a worm and worm gear drive as in a speed reducer with anti-friction elements interposed between the worm and worm gear that is capable of transmitting power at lower initial and operating costs and with less noise than with speed reducers presently used for this purpose. The invention further contemplates worm gearing with anti-friction elements such as balls in a series movably interposed between the worm and worm gear for effecting the driving engagement therebetween wherein the antifriction elements are continuously transferred from one portion to another portion of the worm with a movement to and from the grooves of said worm that is tangential thereof whereby the structure is usable for high speed operation and is economical to manufacture.

The principal objects of the present invention are to provide an anti-friction worm and worm gear drive wherein anti-friction elements are interposed between the worm and worm gear and the movement of said elements is constantly in a controlled path; to provide such a structure wherein the anti-friction elements are balls arranged in a series with all angular changes in the direction of travel of the balls being substantially tangential with an absence of sharp angular directional changes; to provide such a structure with a transfer path the traverse of which is short and consistent with gradual curve changes therein; to provide such a structure adapted for avoiding wear on the edges of the teeth or groove of the worm and worm gear; to provide such a structure with a worm fixed to a drive shaft suitably supported in bearings of a housing and a worm gear and a continuous series of balls interposed between the worm and worm gear and the worm and worm housing; to provide such a structure wherein the ball path is confined within housing inner surfaces and is in an external helical worm groove, through a curve at one end in a spiral to an inner helical groove to the opposite end and out on a spiral curve to the outer groove whereby each ball moves along interconnected inner and outer paths; to provide such a structure wherein the worm has a rim spaced from the shaft with a web therebetween and the ball transfer by the inner spiral is through a passage in the web of the worm; to provide a worm and worm gear mechanism with balls interposed therebetween with a ball transfer mechanism externally of said worm and worm gear; to provide such a worm and worm gear mechanism with a transfer worm and discontinuous strings of balls and a tangential platform between the worm and transfer worm cooperating with the housing to transfer the balls to and from the worm; to provide a worm and worm gear drive with a portion movable in response to the loading on the balls between the worm and worm gear and mechanism operative in response to such movement to move the worm relative to the worm gear for adjusting the pressure angle or axial position of the balls; to provide a worm and worm gear speed reducer in which the total frictional resistance between the worm and worm gear is reduced to the greatest practical extent; to provide a practical mechanism which can be operated at high speeds; and to provide a worm and worm gear drive mechanism which is efficient in operation, capable of long life and that can be manufactured at reasonable cost.

Other objects and advantages of this invention will become apparent from the following description taken in connection with the accompanying drawings wherein are set forth by way of illustration and example certain embodiments of this invention.

FIG. 3 is a fragmentary sectional view through the drive taken on the line 3—3, FIG. 2.

FIG. 4 is a transverse sectional view through the drive taken on the line 4—4, FIG. 3.

FIG. 5 is a sectional view similar to FIG. 3 with the worm rotated approximately one-quarter turn.

FIG. 6 is an enlarged detailed perspective view of the worm.

FIG. 7 is a diagrammatic end elevation of the series of balls in their respective relative positions when the worm is in the position illustrated in FIG. 3.

FIG. 8 is a diagrammatic side elevation of the ball positions of FIG. 7.

FIG. 9 is a partial side elevation of a modified form of a worm and worm gear drive, particularly showing the housing mountings and the ball angle and position adjusting mechanism.

FIG. 10 is an end elevation of the worm and worm gear drive illustrated in FIG. 9.

FIG. 11 is a diagrammatic view of the control system for adjusting pressure angle or the effective radius of the driving balls.

FIG. 12 is a fragmentary sectional view through the worm and worm gear driven taken on the line 12—12, FIG. 13.

FIG. 14 is a fragmentary view substantially the same as FIG. 13 with the worm rotated substantially one-fourth turn from that shown in FIG. 13.

FIG. 15 is a horizontal sectional view through the worm housing and transfer worm taken approximately on the line 15—15, FIG. 14.

FIG. 16 is a diagrammatic view of a ball between the worm and worm gear showing the pressure angle.

FIG. 17 is an enlarged fragmentary view of a ball engaged in a modified form of groove in the worm and worm gear.

FIG. 18 is a further form of groove with rounded edges to facilitate tangential entry of balls therein.

Figure 1:
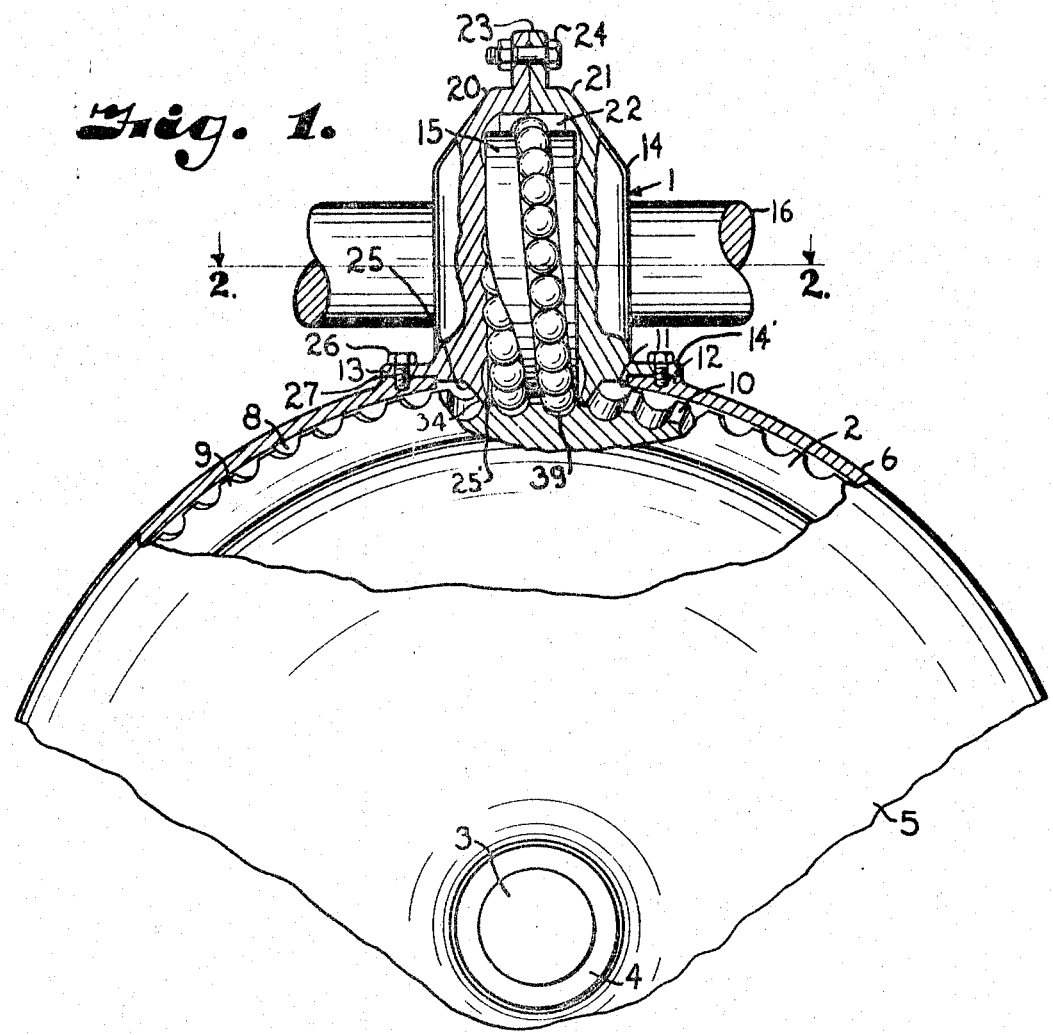
FIG. 1 is a partial side elevation view of a worm and worm gear drive embodying the features of the present invention with portions broken away to show the series of anti-friction elements.

Referring more in detail to the drawings:

The reference numeral 1 generally designates a worm and worm gear mechanism of the present invention which is capable of many applications, particularly in structures wherein a relatively high input speed is desired with a low output speed as in speed reducers and the like having relatively high ratios.

In the structure illustrated, the mechanism 1 includes a worm gear 2 suitably secured to a driven shaft 3 to rotate therewith. The shaft 3 is rotatably mounted in suitable bearings 4 of a worm gear housing 5 which surrounds the worm gear 2 and has a peripheral portion or wall 6. The worm gear 2 has a plurality of grooves 8 spaced therearound and extending across the peripheral edge at an angle to the axis of the shaft 3. The grooves 8 may be of any suitable cross-section, and, in the illustrated structure, are generally circular sections and define projections or teeth 9 therebetween. The peripheral edge face of the worm gear is concave as at 10 and the spaced grooves 8 extend across the concave face 10 at a substantially uniform depth. The wall 6 of the housing 5 has an opening or slot 11 surrounded by a thickened portion or frame 12 having externally directed faces 13 for receiving and mounting portions or flanges 14' of a worm housing 14.

The structure includes a worm 15 which is formed with or secured to a drive shaft 16 to rotate therewith. The worm 15 is mounted in a cavity 17 of the worm housing 14 and said housing has end openings 18 in which are mounted anti-friction bearings 19 such as ball bearings which rotatably support the drive shaft 16 and the worm 15 carried thereby. In the structure illustrated, the bearings 4 and 19 are so located with respect to each other that the axes of rotation of the worm gear 2 and worm 15 are substantially at right angles to each other and the peripheral face of the worm gear has the concavity 10 to accommodate the periphery of the worm 15.

The housing 14 preferably consists of separable parts 20 and 21 for facilitating manufacture and assembly, said parts having substantially corresponding cavities 22 to cooperate to form the housing interior cavity structure 17 in which the worm 15 is located. The housing 14 with the worm therein has flanges or ears 23 with suitable fastening devices such as bolts 24 for securing the parts 20 and 21 together and, when so assembled and arranged over the opening or slot 11 in the housing 6, the lower portion 25 of the housing 14 extends through the slot or opening 11 into close proximity with the periphery of the worm gear 2, as illustrated in FIG. 1. Oppositely extending flanges 14' of the housing 14 overlie the surfaces or faces 13 and are secured to the housing 2 by suitable fastening devices such as screws 26. Shims 27 of suitable thickness may be used between the flanges 14' and surfaces 13 to alter the positioning of the worm 15 relative to the worm gear 2 to vary the preload on anti-friction elements 39 therebetween, as later described.

The worm 15 is fixed relative to the shaft 16 and, in the illustrated structure, has a web portion 28 extending from the hub or shaft portion 29 and terminating in an annular rim 30. A helical groove 31 preferably corresponding in cross-section to the grooves 8 in the worm gear and shown in cross-section as generally circular sections extends around the rim periphery 32. The radii of the cross-section of the groove 31 are substantially equal to the respective opposite radii of the grooves 8 in the worm gear 2 so that they substantially correspond in cross-sectional shape, and the lead of the groove 31 is equal to or an integral multiple of the spacing between adjacent grooves 8 in the worm gear 2. The helical angle of the grooves 8 and 31 are the same, that is, the angle between each groove and the axis of the worm gear 2 is equal to the helix angle of the helical groove 31 in the worm 15 at the pitch line. With this arrangement, the successive turns of the groove 31 are in alignment with successive grooves 8. Also, the radius of the concave peripheral face 10 of the worm gear 2 is greater than the radius of the periphery 32 of the worm 15 so that when in operative positive the concave periphery 10 of the worm gear has suitable spacing from the periphery 32 of the worm 15, and substantially embraces a portion thereof. The inner or lower portion 25 of the housing 14 at each end of the worm 15 extends into the opening 11 and has only slight spacing as at 34 from the concave periphery 10 of the worm gear 2 so that the lower edge 25' is below the center of the balls or anti-friction elements 39 as later described.

The worm 15 may have a plurality of turns of the groove 31; however, in the structure illustrated, the external portion of the groove 31 extends slightly more than one turn and then, at points 35 or at opposed ends of the groove, there is a communication with a transfer or traverse structure 36 which includes a passage 37 through the web 28 with internal helical grove portions 38 extending oppositely therefrom and connected by a spiral portion that merges tangentially with the ends 35 of the external groove 31. A plurality of anti-friction elements such as balls 39 are arranged in a series and occupy the entire length of the groove 31, the internal groove portions 38 and passage 37. In the illustrated structure, it is preferred that the balls have a radius slightly less than the cross-sectional radii of the helical groove 31 in the worm 15 and the grooves 8 in the worm gear 2.

Figure 2:
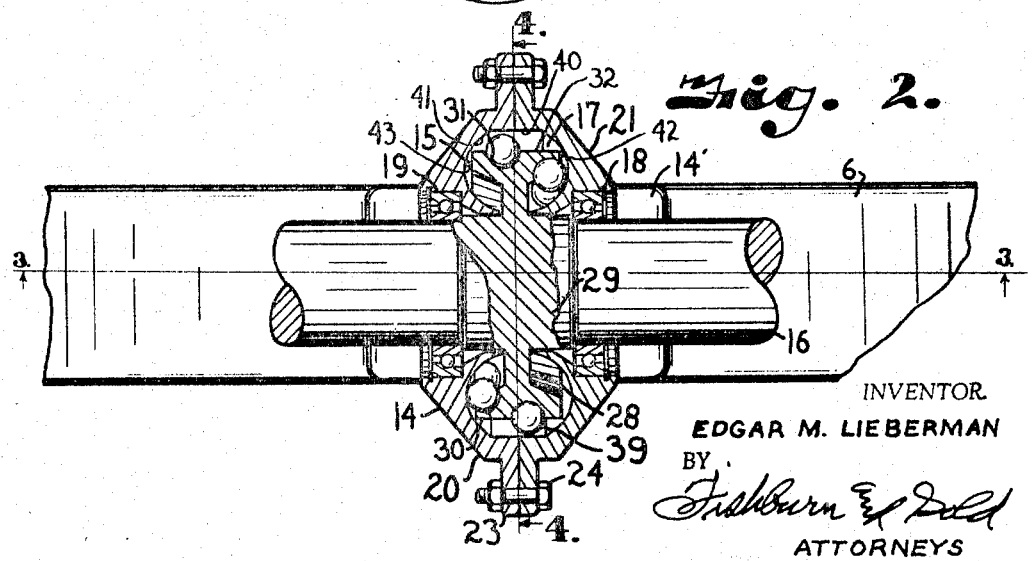
FIG. 2 is a top view of the worm and worm gear drive with portions broken away substantially on the line 2—2, FIG. 1.

The surfaces defining the cavity 17 in the housing 14 cooperate with the worm and worm gear in retaining the balls 39 in their grooves and their defined paths, said surfaces being spaced from the worm to accommodate the balls with suitable operating clearance. The surfaces of the cavity 17 are substantially surfaces of revolution around the axis of the shaft 16 and, in the illustrated structure, include an outer peripheral surface 40 that corresponds to the contour of the worm for a length in the direction of the axis of the shaft 16 slightly exceeding the spacing between centers of the groove portions adjacent the ends 35, said surface 40 merging into radially inwardly and axially outwardly curved portions 41 that extend beyond the ends 42 of the worm 15 and then turn inwardly in curved portions 43 that terminate adjacent the opposite surfaces of the web 28, as illustrated in FIG. 2. These surfaces are all arranged so that as the balls 39 move in the grooves of the worm, both internal and external they have contact with the groove surfaces of the worm and also with the surfaces of the housing defining the cavity 17 except for the time necessary for movement of a ball through the passage 37 and the time they contact the worm gear, thereby maintaining continuous control of the ball movement. With this arrangement, the balls move in a turn around the worm and in interposed relation between the worm and worm gear to effect a drive of the worm gear in response to rotation of the worm shaft 16. Then the balls spiral inwardly substantially of said external groove through the transfer passage and again outwardly to merge into the outer groove substantially in a continuous or gradual curving path with no sharp or angular changes in direction of ball movement. In the structure illustrated, with only slightly more thane on turn of the groove 31 on the worm because of the preload there is a substantial pressure angle on the balls in contact between the worm and worm gear. If zero pressure angle exists, contact between the balls and the worm gear and worm will always be at the edge of the worm gear groove and periphery of the worm, and unless the balls are driven at much higher than normal speeds through their traverse, the resulting centrifugal force would be insufficient to materially change the angle of contact between the ball and the worm gear, resulting in excessive wear adjacent the edge of the worm and worm gear grooves under high loads.

In the structure illustrated, the shims 27 are changed to adjust the worm 15 relative to the worm gear 2 to provide a desired preload and minimum pressure angle between the worm 15 and worm gear 2 through the balls 39. Then, with the structure assembled as illustrated and described and with a continuous series of balls interposed between the worm and worm gear and the worm and worm housing, the shaft 16 is rotated, rotating the worm 15 so that the helix of the groove 31 in the worm and the balls forming the driving engagement between the worm and worm gear effects rotation of the worm gear 2 and the shaft 3. The balls are driven by the relative movement of the points or surfaces of the worm 15 and worm gear 2 in contact with the balls, said points or surfaces being diametrically opposite. This effects a bodily movement of the balls in their paths and, since there is a continuous series, they are maintained in the desired positions with positive control. When the balls are not in contact with the worm gear, they are controlled by the groove 31 in the worm and the surfaces of the housing forming the cavity 17, and the surfaces 43 cooperating with the inner groove 38 of the worm control, the balls on opposite sides of the web of the worm to provide for a smooth change of direction of the movement of the balls and eliminate sharp obstacles to their travel, high wear points and excessive noise.

The lower edge portion 25' of the housing with the adjacent part of the curved surface 41 form conical ball contact portions 44 for engaging and lifting the balls out of contact with the worm gear to avoid interference with the worm gear teeth, thereby facilitating the smooth even transfer of the balls. While the inner surface of the housing, the conical pick-up and the internal groove effect the ball movement, the curvature of movement of the balls is substantially the same even though in the traverse or transfer passage the effective movement longitudinally of the axis of the worm is to the opposite end of the worm as, for example, if the worm is turning in a clockwise direction (FIG. 4), the balls in movement in the transfer passage would be from right to left (FIG. 3) and then on returning to the outer groove 31 at the left end (FIG. 3) the balls would progress to the right end in completing their circuit.

In the form of the invention illustrated in FIGS. 9 to 15 inclusive, there is an external transfer or return in an anti-friction worm drive and a preload or pressure angle control particularly adapted for large units. In the structure illustrated, there is a worm gear 50 mounted on and rotatable with a shaft 51 suitably supported in bearings (not shown) carried in a housing 53 which encloses the worm gear 50. There is also a worm housing 54 supported relative the housing 53 as later described. Mounted in the worm housing is a worm shaft 55 rotatably mounted on anti-friction bearings 56 which may be any suitable radial thrust combination carrying bearing structures but, in the illustrated structure, are shown as tapered roller bearings having inner races 57 mounted on the shaft 55 with inner ends 58 abutting opposed end faces 59 of a worm 61 that has a groove 62 arranged in a helix about the periphery 63 thereof.

Figure 13:
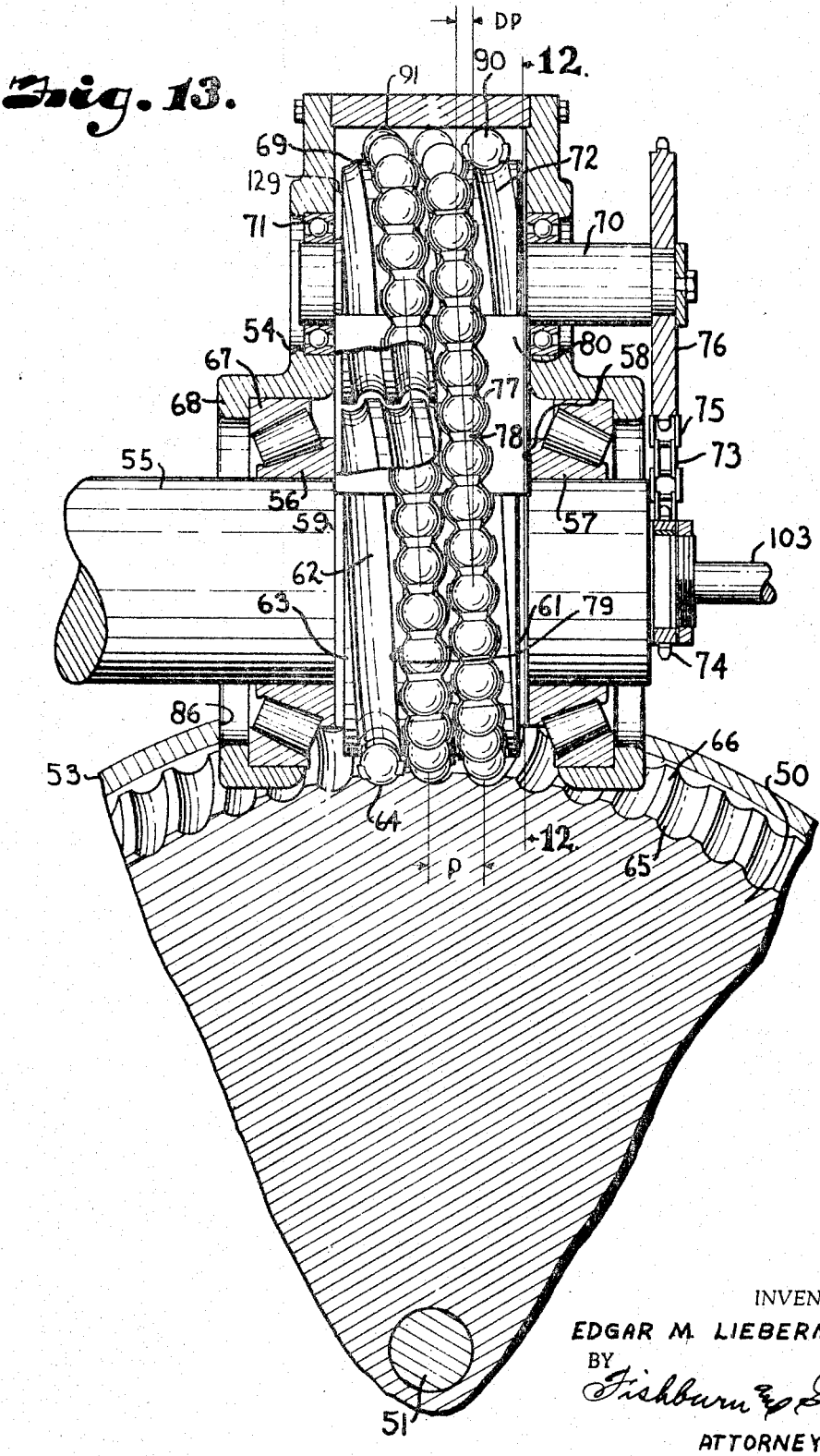
FIG. 13 is a fragmentary side elevation of the drive illustrated in FIGS. 12 and 14 with portions of the housing broken away to show the worm, worm gear, transfer worm and ball strings.

In the illustrated structure, the helix of the groove 62 is of a single lead type and is of such size as to receive anti-friction elements such as balls 64. The groove 62 corresponds in cross-section to grooves 65 that extend across the peripheral face 66 of the worm gear and at an angle with respect to the axis of the gear. The grooves 62 and 65 may be of any suitable cross-section and are illustrated as less than semi-circular. The peripheral edge face 66 of the worm gear is concave to accommodate the periphery of the worm 61 with substantial clearance. The lead of the groove 62 in the worm 61 is equal to the spacing between adjacent grooves 65 in the worm gear 50 on the pitch lines, and the lead angle of the grooves in the worm gear and worm through the groove centers are substantially identical and, consequently, successive turns of the helical groove 62 in the worm are in alignment with successive grooves 65, as illustrated in FIG. 13. The thrust of the worm is resisted by the bearings 56 and the outer races 67 thereof abut against shoulder 68 in the worm housing 54.

A transfer worm 69 is slidably mounted on a shaft 70 which is rotatably supported on suitable bearings 71, preferably anti-friction bearings, the axis of the shaft 70 being parallel with the axis of the worm shaft 55. The transfer worm is connected to the shaft 70 as by a key 70' for rotation therewith while permitting some axial movement of said transfer worm in the housing 54. The transfer worm has a helical groove 72 therearound and the pitch of the groove in the transfer worm 69 is equal to or an integral multiple of the pitch of the worm 61 as, for example, double, in the illustrated structure. Also, the shafts 55 and 70 of the worm 61 and transfer worm 69 respectively are interconnected so that they rotate in the same direction by suitable positive transmission means 73, as for example by a sprocket 74 fixed relative to the shaft 55 and operatively connected by a chain 75 with a sprocket 76 fixed on the transfer worm shaft 70. The ratio of pitch diameter of the sprocket 76 on the transfer worm shaft to the pitch diameter of the sprocket 74 that is fixed to the worm shaft 70 is the same as the ratio of the lead of the transfer worm 69 to the lead of the worm 61; in the illustrated structure, it is 2 to 1.

Discontinuous strings of the balls 64 move in the grooves 62, 65 and 72 with the balls of a string being interconnected by keepers 77 that form a semi-flexible link-like structure maintaining the balls in the string in a constantly spaced relationship one from another. In the structure illustrated, there are two strings of balls 78 and 79 moving in the same orbital area. Each string is preferably of a length to extend not less than a complete circuit around the worm 61 and transfer worm 69. In their paths of travel, the balls of the strings move over tangent platforms 80 and 81 respectively on opposite sides of the worm and transfer worm. The tangent platforms are each fixed relative to the housing 54 and present outer surfaces 82 that are substantially tangentially arranged relative to the root of the groove 62 of the worm and groove 72 of the transfer worm so that the strings of balls can extend tangentially of said grooves in moving from the worm to the transfer worm. The outer surfaces 82 are substantially planar so that the strings of balls can have necessary lateral movement in the constantly changing position of the groove they are entering as said entering point of the grooves moves axially of the respective structures as the worm and transfer worm are rotated. The tangential inner surfaces 83 of the housing 64 are parallel with the surfaces 82 and spaced therefrom to accommodate the balls with a suitable operating clearance. The surfaces 83 are tangential with an arcuate lower surface 84 and an arcuate upper surface 85 which surround adjacent portions of the worm and transfer worm respectively and cooperate with the respective grooves in retaining the balls as they move therearound. The lower part of the worm housing 54 covers an opening 86 in the gear housing 53 and also has an opening 89 with edges adjacent sides of the worm gear 50 so that the surface 84 substantially merges with the roots of the grooves 65 in the worm gear.

The structure is such that it would operate the same with either direction of rotation and, if the worm shaft 55 is rotated in a counter-clockwise direction (FIG. 12), the strings of balls also will move in a counter-clockwise direction, and the arrangement of the grooves 72 in the transfer worm 69 is such that in the relative speed of rotation and movement of the string of balls, the end 90 of the string 79 will move downwardly over the surface 82 of the tangent platform 80 and enter a groove 62 of the worm 61 in leading relation to the other end 91 of said string of balls. With this arrangement, the net axial displacement of each ball during one complete traverse of the mechanism is zero. The number of rotations of the worm negotiated during each complete traverse is substantially exactly integral. Also, the distance traveled by each ball while out of contact with the worm is substantially exactly equal to the distance that the string of balls is driven while the ball is out of contact with the worm during each complete traverse. These requirements are met by establishing the proper ratios of effective ball radius, transfer worm pitch radius, and center distance between the transfer worm and worm to the worm pitch radius and the axial displacement of the worm and transfer worm threads. While, in the illustrated structure, two discontinuous strings of balls are shown, with appropriate design modifications one could be used or more than two could be used. Under conditions in which a minimum backlash is desired, a single discontinuous string of balls is preferred with the string arranged so that only two full teeth of the worm gear would be contacted at any time. Under conditions of higher load requirements with a greater number of teeth of the worm having driving engagement through the balls with the teeth of the worm gear, it is possible that three or four discontinuous strings of balls would be used rather than the one or two.

The housing 54 may be fixed relative to the housing 53 and variation in preload and pressure angle on the balls between the worm and worm gear altered by use of shims or the like. However, in the structure illustrated, there is a pressure angle control system which will vary the preload and automatically control the pressure angle. In the illustrated structure, the pressure angle for transmission of power from the worm to the worm gear is shown as 45 degrees, and the worm and transfer worm mechanism is mounted to the worm gear through their respective housings by means of open end links 93 arranged at 45 degrees to a horizontal transverse plane through the axis of the worm shaft 55. In the structure illustrated, the worm gear housing 53 has bracket members 94 extending outwardly and upwardly to a position alongside of the worm portion of the housing 54. The brackets 94 are in opposed relation and have spaced bearing portions 95 mounting pins or trunnions 96 in laterally spaced apart relation and mounting the links 93 whereby there is at least a pair of such links on opposite sides of the housing 54. The open ends of the links 93 on each side of the housing 54 engage trunnions or pins 97 that extend from the worm housing 54 in opposed relation with the axis of said trunnions 97 being approximately on a line extending through a center ball engaged between the worm and worm gear. Due to this arrangement for the support of the worm and transfer worm mechanism, any change in the load on the worm gear will produce a corresponding change in the preload between the worm gear and the worm through the balls. A generally U-shaped arm 98 extends over the housing 54 with legs 99 extending downwardly alongside of same and having bearing openings 100 rotatably receiving the ends of the trunnions 97. The legs 99 each have an eccentric member 101 rotatably mounted in a bearing opening 102 in the brackets 94. The eccentric is offset from the axis of the trunnions 97 in a direction axially of the worm shaft 55 so that rotation of the eccentric tends to provide a minute movement of the worm housing 54 and worm 61 toward or away from the worm gear 50.

The arm 98 is actuated by an air pressure control system and, in the illustrated structure, the worm shaft 55 is provided with an extension 103 that drives a pump 104 mounted on a bracket 105 carried by the worm housing 54 to provide the air pressure for the system. Feeler tubes 106 and 107 are mounted in the housing 54 at opposite ends of the transfer worm 69 with open ends 108 of said tubes in proximal spaced relationship to end faces 109 of said transfer worm 69 whereby any axial movement of said transfer worm will tend to move same toward and away from the respective feeler tubes or sensing means permitting air to escape lowering the pressure on one side and raising it on the other side and effecting movement in a four-way servo valve 110. In the structure illustrated, the control may operate in either direction and has lines 111 and 112 each with atmospheric check valves 113. The lines are connected through branches 114 and 115 respectively to opposite sides of an automatic reversing valve 116. The valve 116 is also connected through a line 117 to a reducing valve 118 which has an output 119 with branches 120 and 121 connected to the sensing tubes 106 and 107 respectively and also connected to opposite ends of the servo cylinder in the four-way servo valve 110. The high pressure lines 111 and 112 from the pump 104 are connected to the four-way ports in the servo valve 110 which is connnected through lines 122 and 123 to a cylinder 124 having a piston 125 connected by the piston rod 126 to the arm 98. The requirements for the pressure system are small and, therefore, the pump 104 can be quite small requiring only a minimum of power.

In the structure shown in FIGS. 12 to 15, there is a continuous repetitive path of the balls and there are two shifting lugs 129 preferably forming portions of the housing 54. The position of the shifting lugs 129 is such that they are contacted by the two balls on each end of the transfer mechanism for the purpose of moving the transfer worm 69 axially on its shaft to initiate a change in the pressure angle between the worm 61 and gear 50 through the balls 64 by the adjusting pressure angle control system. Obviously, different methods and structure for accomplishing the adjustment of the pressure angle may be utilized; however, the particular arrangement illustrated is self-contained and will automatically control the pressure angle regardless of whether the worm and transfer worm are rotating in a clockwise or counter-clockwise direction. In the case of unidirectional devices, the reversing feature of these controls becomes unnecessary.

The operation and movement involved in this form of the device will be clarified by the following principles. The worm gear 50 may be considered in an analogy like an inner race and the worm an outer race with the balls 64 in contact therewith. In the case of a rotating inner race in contact with a ball which, in turn, is in contact with an outer race not subject to rotational displacement, the angular displacement ($\theta$) of the ball center during any given angular movement ($\gamma$) of the inner race ($\delta$) is equal to the angular movement of the inner race multiplied by the distance from the center of the inner race to the ball center (R) less the effective radius ($a$) of the ball, the entire quantity divided by (2R) wherein the respective symbols are as shown in FIGS. 12 and 16 with (R) equalling the pitch radius of the worm, ($a$) equalling the effective radius of the ball, ($\theta$) equalling the change of ball angle ($\gamma$) equals the change in the worm angles. It thereby follows that to calculate the change in angular position of the ball in view of the angle of the worm, the following formula and solution would be used:

(1)
$$\gamma(R-a) = 2\theta R$$
$$\theta = \frac{\gamma(R-a)}{2R}$$

or (2)
$$\frac{(\gamma-\theta)(R-a)}{2\pi a} = \frac{(R+a)}{2\pi a}$$
$$\gamma R - \gamma a - \theta R + \theta a = \theta R + \theta a$$
$$\gamma(R-a) = 2\theta R$$
$$\theta = \frac{\gamma(R-a)}{2R}$$

Further symbols are shown on FIGS. 12 and 13 and the definitions of those symbols are as follows:

$P$ = pitch of worm
$R$ = pitch radius of worm
$r$ = pitch radius of transfer worm
$a$ = effective ball radius
$n$ = ratio-transfer worm pitch:worm pitch, worm speed: transfer worm speed
$2\delta$ = $\angle$ of ball contact with transfer worm
$D$ = axial displacement factor
$PD$ = axial displacement
$\lambda$ = lead angle of worm thread
$x$ = number of complete revolutions of worm during traverse
$I$ = distance between centers of worm and transfer worm
$O$ and $O'$ = tangent points on worm
$S$ and $S'$ = tangent points on transfer worm
$t$ = number of half pitches ball string spans axially in one transfer wrap ($OSS'O'$)
$A$ = actual cylindrical $\angle$ traversed by the balls during contact with the transfer worm
$M$ = actual angle traversed by the balls between tangent points in the plane of the tangent parallel to the axes In utilizing the symbols and appropriate definitions, the following formulas are utilized and, in order to establish relationships of dimensions of the mechanism to the worm pitch radius, $R=1$ in the following equations:

(1)
$$xP\frac{R-a}{2R} = P\left(2D + \frac{n\delta}{\pi}\right)$$
$$a = \frac{\pi(x-4D) - 2\delta n}{\pi x}$$

Axial movement of ball in one direction = movement of ball in opposite direction.

(2)
$$2D = \frac{t-n}{2}$$

Ball leaves and enters worm threads at the same attitude.

(3)
$$\frac{2I \sin \delta}{\cos M} + \frac{2r\delta}{\cos A} = \frac{\left[2\pi rx - (2\pi R - 2R\delta)\frac{2R}{R-a}\right]\frac{R-a}{2R}}{\cos \lambda}$$

During transfer ($OSS'O'$) ball travels the distance equal to the distance that the string of balls is driven by the number of revolutions of the worm during complete traverse, minus the distance balls are driven during contact with the worm.

(4)
$$\cos \lambda = \frac{2\pi R}{\sqrt{4\pi^2 R^2 + P^2}}$$

(5)
$$\cos A = \frac{2r\delta}{\sqrt{4r^2\delta^2 + \left(nP\frac{2\delta}{2\pi} - P\frac{\delta r}{\pi n R}\right)^2}}$$

(6)
$$\cos M = \frac{2I \sin \delta}{\sqrt{4I^2 \sin^2 \delta \left\{2DP - \left[xP\frac{R-a}{2R} - P\left(1-\frac{\delta}{\pi}\right) - P\frac{2\delta r}{2\pi n R}\right]\right\}^{2'}}}$$

(7)
$$I = R + r - 1.414a$$

Minimum center distance from worm to transfer worm if pressure angle = 45°

(8)
$$\sin \delta = \frac{\sqrt{I^2 - (R-r)^2}}{I}$$

For the mechanism to operate properly, it is necessary that the net axial displacement of each ball during one complete traverse of the mechanism be zero (see Equation No. 1 above). It is necessary that the number of rotations of the worm negotiated during each traverse be exactly complete rotations (see definition of $x$ above). It is also necessary that the distance traveled by each ball while out of contact with the worm be exactly equal to the distance that the string of balls is driven while the ball is out of contact with the worm during each complete traverse (see Equation No. 3 above). These conditions are satisfied by the equations above and, with the assignment of practical values to P, n, x and t, satisfactory values for (1.414a) the ball radius, (r) the transfer worm pitch radius, and (I) the distance between the centers of the worm and transfer worm all with reference to (R), the worm pitch radius can be found.

In the illustrated structure, the pressure angle for transmission of power from the worm to the worm gear was arbitrarily chosen as 45 degrees. For that reason, the worm and transfer worm mechanism is mounted to the worm gear through their respective housing by means of the open-ended links 93 which are arranged on corresponding angles, namely 45 degrees. In this way, any change in the load on the worm gear will produce a corresponding change in the preload between the worm gear and worm through the balls. Wear or minor miscalculations in design could be responsible for the balls tending to move axially in one direction or another during continued use, and the pressure angle adjustment control varies the preload as required to return the balls to their proper path.

Minimum impact between the balls and other parts of the mechanism should be maintained for operation at high speeds. This is accomplished by designing the mechanism for small angles of entry into the worm and transfer worm and by minor modifications in the shapes of the worm and transfer worm threads. In the mechanism shown, the entry and exit angle of the ball to the worm is about 2.6 degrees. By extremely minor modifications of the outer portions of the worm thread, entry and exit can be made tangential. The angle of approach of the ball to the transfer worm is approximately 7 degrees. In this case, wear or peening of the transfer worm is unimportant except insorfar as it might affect the balls and minor modification of the transfer worm thread could easily provide tangential entry of the ball into the transfer worm thread.

In use, power is applied to the worm shaft 55 to rotate same, rotating the worm 61 and through the engagement of the balls 64 between the worm and worm gear 50 the worm gear is rotated to rotate the driven shaft 51. As the worm shaft 55 is rotated, the transfer worm shaft 70 and transfer worm 69 are rotated in the same direction as the rotation of the worm 63 by the drive connection 73. The strings of balls move or exit from between the worm gear 50 and worm 61 and then move between the worm and housing 54 over the outer surface 82 of the platform 80 and then over the transfer worm and back down the opposite side of the housing 54 over the platform 81 and back for entry between the worm and worm gear at the opposite side of the worm gear to again effect the driving engagement between the worm and worm gear. If, because of wear or minor miscalculation, the paths of the balls around the transfer worm tend to move axially in one direction or another during continued use, the preload is varied slightly to cause the path of the balls to return to normal. If the preload is less than desired during anti-clockwise rotation of the worm (FIG. 12), the end balls will contact the right lug 129, thereby moving the transfer worm to the left (FIG. 13), and this will result in the transfer worm moving away from the end 108 of the feeler tube 106 and toward the end of opposite feeler tube 107 and thereby permit escape of air from the line 121 and reduction of pressure on that end of the servo valve 110 and restricting escape of air from line 120 and effecting an increase of pressure on its side of servo valve 110. This lowering of the pressure on one side and raising the pressure on the other side of the four-way servo valve 110 effects movement whereby increased pressure is supplied from the output of the pump through the line 123 to the cylinder 124 and increased exhaust through line 122 from the cylinder which is mounted as at 127 on a bracket 128 on the housing 54 whereby extension of the piston will move the arm 98 to the left (FIG. 9) slightly rotating the eccentric 101 to increase the preload, the pressure angle and the effective ball radius. This action results in a minute adjustment in the rate relative to the design rate of the balls as they rotate relative to the worm and transfer worm in their traverse so that their axial relationship is adjusted and the end ball ceases to contact the lug 129 and the transfer worm moves back toward center position wherein the sensing devices 106 and 107 tend to be equalized. If the operation is such that the end balls tend to contact the lug 129 at the other end of the transfer worm 69, the pressure against the lug will cause the transfer worm to have axial movement whereby the end of the tube 107 is opened providing decrease in pressure in line 120 and increase in pressure in line 121 which is applied to the four-way servo valve 110 to effect movement therein. This is a reverse action to that described for movement of balls to the left and causes the pressure from the output of the pump to be applied through line 121 to the cylinder 124 to effect contraction of the cylinder and piston structure, swinging the arm 98 to the right (FIG. 9) which, due to the eccentric relationship of the axis of the trunnion 97, tends to move the worm housing 54 and worm therein away from the worm gear and decrease the pressure angle and effective ball radius. A similar adjustment may be accomplished by varying the center distance between the worm and transfer worm so that instead of making minor adjustments in the speed of the balls relative to the worm and transfer worm, the mechanism would make minor adjustments in the total distance traveled by the balls in its traverse and thereby adjust the balls to remain in their designed paths.

It is believed the anti-friction worm gearing constructed as described and illustrated is a mechanism capable of operating at high speeds with minimum impact between the balls and other parts of the mechanism. This is due to the infinitesimal angles of entry into the worm and transfer worm and by the proper shapes of the worm and transfer worm threads. Also, the grooves in the worm and worm gear may be varied. In the diagrammatic view of FIG. 16, the grooves are shown substantially less than semi-cylindrical and an arrow 130 represents the preload force on the ball and the line 131 indicates the line of contact and the arrow 132 represents the direction of the force of the applied load by the worm to the worm gear through the ball. The shape of the grooves may vary as, for example, as illustrated in FIG. 17, the grooves 133 and 134 in the worm and worm gear respectively are formed by arcuate faces 135 of a radius slightly greater than the radius of the ball 136 so that the grooves have portions 137 or a root diameter such that the lower portions of the grooves are not contacted by the balls.

In the form shown in FIG. 18, the edges 138 of the groove 139 which is representative of both the worm and transfer worm groove is rounded or formed on a radius which will facilitate entry and exit of the ball to and from the grooves with only infinitesimal changes in angle as the ball progresses and a minimum of impact and wear. This minor modification of the outer corner of the grooves can make the entry and exit of the balls tangential to the prior and subsequent direction of travel.

The mechanism constructed as described and illustrated also has low internal losses as the flexible keeper prevents adjacent surfaces of the balls from rubbing each other in opposite directions. Furthermore, the lubricant required can be light oil instead of heavy grease that is normally used in worm gearing. The main pressure angle can also be affected by the groove shape.

It is to be understood that while I have illustrated and described certain forms of my invention, it is not to be limited to the specific form or arrangement of parts herein described and shown except insofar as such limitations are included in the claims.

What I claim and desire to secure by Letters Patent is:
1. Worm gearing comprising,
 (a) a worm gear having a plurality of grooves spaced therearound and extending across its peripheral edge at an angle to the axis of said gear,
 (b) a worm having a driving groove extending externally therearound in a helix, said grooves of the worm and worm gear being of the same helical angle,
 (c) means rotatably mounting said worm and worm gear,
 (d) a plurality of balls in a series interposed between the worm and worm gear for effecting a driving engagement therebetween whereby the worm gear is driven in response to rotation of said worm,
 (e) and means for moving the balls in the series tangentially from said worm groove and returning said balls to said worm groove tangentially thereof with a gradual change of direction of said balls.

2. Worm gearing as set forth in claim 1 including means to provide a substantial pressure angle on the balls and a radial spacing between the contact of said balls with the worm gear and of said balls with the worm thereby separating the worm and gear surfaces.

3. Worm gearing as set forth in claim 2 wherein the means for transferring the balls includes housing means extending into the space between the worm and worm gear to engage the balls below their centers for picking up and starting said balls in their transfer movement.

4. Worm gearing comprising,
 (a) a worm gear having a plurality of grooves spaced therearound and extending across its peripheral edge at an angle to the axis of said gear,
 (b) a worm having a driving groove extending externally therearound in a helix,
 (c) means rotatably mounting said worm and worm gear,
 (d) said grooves in the worm and worm gear having the same helical angle so that successive turns of the groove of said worm are in alignment with successive grooves of the worm gear,
 (e) a plurality of balls in a series interposed between the worm and worm gear for effecting a driving engagement therebetween whereby the worm gear is driven in response to rotation of said worm,
 (f) and means for moving the balls in the series tangentially from said worm groove at one side of said worm and transferring said balls to the other side of said worm and there re-introducing said balls into the worm groove substantially tangentially of said worm groove.

5. Worm gearing as set forth in claim 4 wherein the means for transferring the balls includes an internal passage in the worm communicating with helical internal grooves which extend to and merge tangentially with opposite ends of the outer helical groove of the worm.

6. Worm gearing comprising,
  (a) a worm gear having a plurality of grooves extending across its peripheral edge at an angle to the axis of said gear,
  (b) a worm having an external groove extending in a helix therearound and having opposite ends, said grooves in the worm and worm gear having substantially the same helical angle,
  (c) said worm having an internal transfer passage and internal helical grooves extending therefrom connecting substantially tangentially with said opposite ends of said external groove whereby said balls move substantially tangentially to and from said grooves with a gradual change of direction,
  (d) means rotatably mounting said worm and worm gears,
  (e) a plurality of balls in a continuous series interposed between the worm and worm gear and extending through the transfer passage and internal grooves, said balls effecting a driving engagement between the worm and worm gear whereby the worm gear is driven in response to rotation of said worm,
  (f) and a housing enclosing said worm and having internal surfaces cooperating with the grooves of the worm and worm gear in defining a path of travel of the balls in the movement through the grooves of the worm.

7. Worm gearing comprising,
  (a) a worm gear having a plurality of ball receiving grooves extending across its peripheral edge at an angle to the axis of said gear,
  (b) a worm having an external ball receiving groove extending in a helix therearound and having opposite ends, said grooves in the worm and worm gear having substantially the same helical angle,
  (c) said worm having an internal transfer passage and internal helical grooves extending therefrom connecting with said opposite ends of said external groove whereby the balls move substantially tangentially to and from said grooves with a gradual change of direction,
  (d) a worm gear housing having an opening in a peripheral portion,
  (e) means rotatably mounting the worm gear in said worm gear housing,
  (f) a worm housing mounted on said worm gear housing at said opening therein,
  (g) means rotatably mounting said worm in said worm housing with the worm housing in close proximity to the worm gear at the opening in the worm gear housing,
  (h) a plurality of balls in a continuous series interposed between the worm and worm gear and extending through the transfer passage and internal grooves, said balls effecting a driving engagement between the worm and worm gear whereby the worm gear is driven in response to rotation of said worm,
  (i) said worm housing enclosing said worm and having internal surfaces cooperating with the grooves of the worm and worm gear in defining a path of travel of the balls in the movement through the grooves of the worm.

8. An anti-friction worm gear drive comprising,
  (a) a driving shaft,
  (b) a worm secured to said driving shaft to rotate therewith and having an external groove extending in a helix therearound and having opposite ends,
  (c) said worm having a rim with a web between said rim and said shaft with the external grooves in the periphery of said rim,
  (d) said worm having an internal transfer passage through the web and internal helical grooves extending therefrom laterally and spirally outwardly and connecting substantially tangentially with said opposite ends of said external groove,
  (e) a worm gear having a plurality of grooves extending across its peripheral edge at an angle to the axis of said gear, said gear being operatively associated with said worm,
  (f) a housing enclosing said worm gear and having an opening through which a portion of the worm housing extends into close proximity with said worm gear,
  (g) a worm housing supported relative to said worm gear housing at the opening therein to extend in said slot and cooperate with the worm gear in enclosing said worm,
  (h) bearing means in the worm housing rotatably supporting the driving shaft,
  (i) a plurality of anti-friction elements in a continuous series interposed between the worm and worm gear and extending through the transfer passage and internal grooves with the anti-friction elements in the aligned grooves of the worm and worm gear to effect a driving engagement therebetween whereby the worm gear is driven in response to rotation of said worm,
  (j) means for altering the relative position of the worm housing and worm gear to effect a preload on the anti-friction elements in driving engagement therewith,
  (k) said worm housing having a portion extending substantially to said web between the drive shaft and worm rim whereby said housing defines a cavity containing said web and rim of the worm and the anti-friction elements in the grooves therein with the surfaces defining said cavity being substantially a surface of revolution and spaced from the grooves to cooperate therewith in defining the path of the anti-friction elements in the rotation of the worm.

9. Worm gearing comprising,
  (a) a worm gear having a plurality of ball receiving grooves extending across its peripheral edge at an angle to the axis of said gear,
  (b) a worm having an external ball receiving groove extending in a helix therearound and having opposite ends,
  (c) means rotatably mounting said worm and worm gears,
  (d) a plurality of balls in a series interposed between the worm and worm gear, said balls effecting a driving engagement between the worm and worm gear whereby the worm gear is driven in response to rotation of said worm,
  (e) transfer means exterior of and operatively connected to said worm for receiving said balls tangentially from the worm groove after said balls have passed across the groove of the worm gear and moving said balls in a path to a position entering the worm groove for a subsequent driving pass across said worm gear,
  (f) and a housing enclosing said worm and transfer means and having internal surfaces cooperating with the grooves of the worm and worm gear and transfer means in defining the path of travel of the balls to and from worm gear driving position.

10. An anti-friction worm gear drive comprising,
  (a) a driving shaft,
  (b) a worm secured to said driving shaft to rotate therewith and having an external groove extending in a helix therearound,
  (c) a worm gear having a plurality of grooves extending across its peripheral edge at an angle to the axis of said gear, said gear being operatively associated with said worm,
  (d) a worm housing supported relative to said worm gear and extending into close proximity to said worm gear, (e) bearing means in the worm housing rotatably supporting the driving shaft,
(f) a plurality of anti-friction elements in a series interposed between the worm and worm gear to effect a driving engagement therebetween whereby the worm gear is driven in response to rotation of said worm,
(g) a transfer worm rotatably mounted in the worm housing and having a helical groove,
(h) said housing and transfer worm having cooperating surfaces defining a path of the anti-friction element in moving to and from the worm.

11. An anto-friction worm gear drive comprising,
(a) a worm gear having a plurality of grooves extending across its peripheral edge at an angle to the axis of said gear,
(b) means rotatably mounting said worm gear,
(c) a worm rotatably mounted on an axis substantially at right angles to the axis of the worm gear, said worm having an external groove extending therearound in a helix,
(d) a transfer worm rotatably mounted on an axis substantially parallel to the worm axis, said transfer worm having a groove extending in a helix therearound,
(e) a plurality of balls in a discontinuous string operating in aligned grooves of the worm and worm gear and extending therefrom over the transfer worm whereby said balls effect a driving engamement between the worm and worm gear and the worm gear is driven in response to rotation of said worm,
(f) guide means between the worm and transfer worm in opposed spaced relation to the axes thereof and defining a ball path substantially tangential to the grooves in the worm and transfer worm to form a supporting member for the balls as they move from one to the other,
(g) means operatively interconnecting the worm and transfer worm for rotating same and maintaining their relative rotative ratio,
(h) the pitch of the transfer worm groove corresponding to the pitch of the groove in the worm and the lead of the groove in the transfer worm being proportioned to the relative rotational speed of the transfer worm and worm whereby the net axial displacement of a ball during one complete traverse is zero.

12. An anti-friction worm gear drive comprising,
(a) a worm gear housing,
(b) a worm gear rotatably mounted in said housing and having a plurality of ball receiving grooves extending across its peripheral edge at an angle to the axis of said gear,
(c) a worm housing,
(d) means on the worm gear housing supporting the worm housing relative thereto,
(e) a worm rotatably mounted in said housing on an axis substantially at right angles to the axis of the worm gear, said worm having an external ball receiving groove extending therearound in a helix,
(f) a transfer worm rotatably mounted in said worm housing on an axis substantially parallel to the worm axis, said transfer worm having a ball receiving groove extending in a helix therearound,
(g) a plurality of balls in a discontinuous string operating in aligned grooves of the worm and worm gear and extending therefrom over the transfer worm whereby said balls effect a driving engagement between the worm and worm gear and the worm gear is driven in response to rotation of said worm,
(h) guide means between the worm and transfer worm in opposed spaced relation to the axes thereof and defining an outer surface substantially tangential to the grooves in the worm and transfer worm to form a supporting member for the balls as they move from one to the other,
(i) said worm housing having inner surfaces substantially engaged by the balls as they move about the worm and transfer worm and therebetween,
(j) means operatively interconnecting the worm and transfer worm for rotating same and maintaining their relative rotative ratio,
(k) the pitch of the transfer worm groove corresponding to the pitch of the groove in the worm and the lead of the groove in the transfer worm being proportioned to the relative rotational speed of the transfer worm and worm whereby the net axial displacement during one complete traverse is zero.

13. An anti-friction worm drive as set forth in claim 12 wherein there are means flexibly interconnecting the balls to maintain the spacing thereof in a flexible discontinuous string.

14. An anti-friction drive as set forth in claim 13 and including,
(a) means operatively connected with the worm housing to move same toward and away from the worm gear housing to vary the relative spacing of the axes of the worm and worm gear and effective engagement of the balls therewith,
(b) and means responsive to endwise movement of the transfer worm for actuating the worm housing moving means to move same and adjust the axial position of the balls as they move to and from the worm.

15. An anti-friction worm gear drive comprising,
(a) a worm gear housing,
(b) a worm gear rotatably mounted in said housing and having a plurality of grooves extending across its peripheral edge at an angle to the axis of said gear,
(c) a worm housing,
(d) means on the worm gear housing supporting the worm housing relative thereto,
(e) a worm rotatably mounted in said housing on an axis substantially at right angles to the axis of the worm gear, said worm having an external groove extending therearound in a helix,
(f) a plurality of balls operating in aligned grooves of the worm and worm gear whereby said balls effect a driving engagement between the worm and worm gear and the worm gear is driven in response to rotation of said worm, said balls progressing longitudinally of the axis of the worm during driving engagement with the worm gear,
(g) and means in said worm housing and operatively engaged with said balls during movement thereof to and from the worm and having portions connecting the balls in a series for effecting transfer of said balls externally of said worm from a point of exit from between the worm and worm gear to a point of reentry therebetween.

16. Worm gearing comprising,
(a) a worm gear having a plurality of grooves spaced therearound and extending across its peripheral edge at an angle to the axis of said gear,
(b) a worm having a groove extending externally therearound in a helix, said grooves of the worm and worm gear being of the same helical angle,
(c) means rotatably mounting said worm and worm gear,
(d) a plurality of balls in a series interposed between the worm and worm gear for effecting a driving engagement therebetween, whereby the worm gear is driven in response to rotation of said worm,
(e) means for transferring the balls in the series to and from the worm grooves and including an internal passage in the worm communication with helical internal grooves which extend to and merge tangentially with opposite ends of the outer helical groove of the worm, whereby the balls move tangentially from the worm groove and return tangentially to a worm groove, and
(f) said worm having a web with a peripheral rim thereon, and the internal and external grooves of said worm are positioned wherein there are two turns of balls in the series with the internal portion being substantially a helix merging in a spiral portion tangentially with the external groove.

17. Worm gearing comprising,
(a) a worm gear having a plurality of ball receiving grooves extending across its peripheral edge at an angle to the axis of said gear,
(b) a worm having an external ball receiving groove extending in a helix therearound and having opposite ends, said grooves in the worm and worm gear having sugstantially the same helical angle,
(c) said worm having an internal transfer passage and internal helical grooves extending therefrom connecting with said opposite ends of said external groove whereby the balls move substantially tangentially to and from said grooves with a gradual change of direction,
(d) a worm gear housing having an opening in a peripheral portion,
(e) means rotatably mounting the worm gear in said worm gear housing,
(f) a worm housing mounted on said worm gear housing at said opening therein,
(g) means rotatably mounting said worm in said worm housing with the worm housing in close proximity to the worm gear at the opening in the worm gear housing,
(h) a plurality of balls in a continuous series interposed between the worm and worm gear and extending through the transfer passage and internal grooves, said balls effecting a driving engagement between the worm and worm gear whereby the worm gear is driven in response to rotation of said worm,
(i) said worm housing enclosing said worm and having internal surfaces cooperating with the grooves of the worm and worm gear in defining a path of travel of the balls in the movement through the grooves of the worm,
(j) and means between the worm housing and worm gear housing for effecting a relative spacing of axes of the worm and worm gear to substantially maintain a selected preload on the balls in drive position between the worm and worm gear.

References Cited

UNITED STATES PATENTS

| | | | |
|---|---|---|---|
| 1,152,001 | 8/1915 | Brinkman | 74—458 |
| 1,347,802 | 7/1920 | Botts | 74—458 |
| 2,403,096 | 7/1946 | Slavic | 74—458 |
| 2,404,378 | 7/1946 | Hoffar | 74—458 |
| 2,451,998 | 10/1948 | Wahlberg et al. | 74—458 |
| 2,455,487 | 12/1948 | Hoffar | 74—458 |
| 2,664,760 | 1/1954 | Booth | 74—458 |
| 2,673,473 | 3/1954 | Phelps | 74—458 |
| 3,188,877 | 6/1965 | Schmidt | 74—425 |

DONLEY J. STOCKING, *Primary Examiner.*

LEONARD R. GERIN, *Examiner.*